J. FRENCH.
Harvester Rake.
No. 98,861. Patented Jan. 18, 1870.
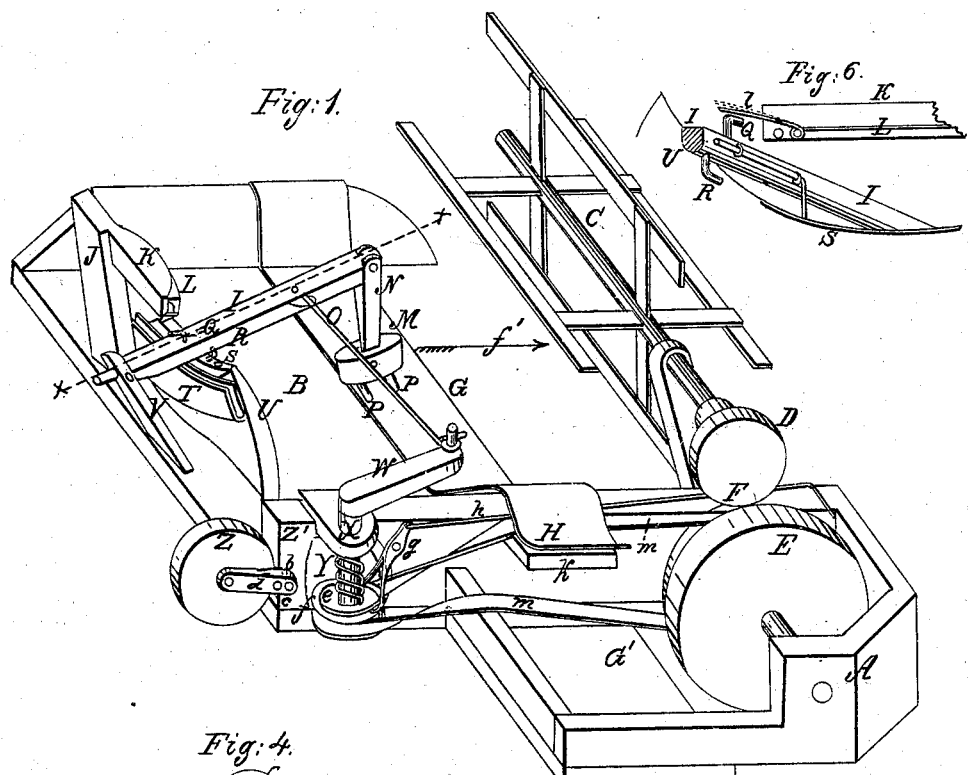
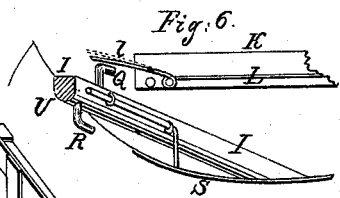
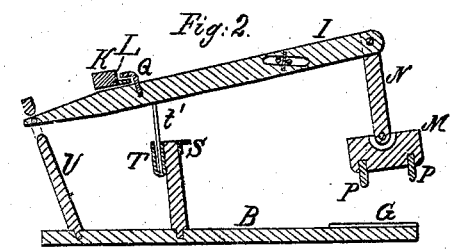
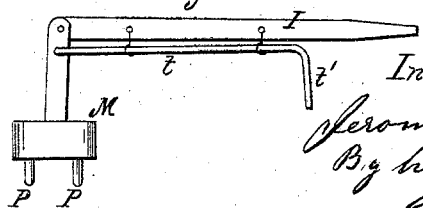
Witnesses.
S. S. Allen
T. Manning
Inventor.
Jerome French
By his attorney
G. D. Chapin

UNITED STATES PATENT OFFICE.

JEROME FRENCH, OF INDEPENDENCE, IOWA.

IMPROVEMENT IN HARVESTER-RAKES.

Specification forming part of Letters Patent No. 98,861, dated January 18, 1870.

*To all whom it may concern:*

Be it known that I, JEROME FRENCH, of Independence, in the county of Buchanan and State of Iowa, have invented an Improvement in Harvesters; and I do hereby declare that the following is a full, clear, and exact description thereof, which will enable those skilled in the art to make and use the same, reference being had to the accompanying drawings, and letters marked thereon, making a part of this specification, in which—

Figure 1 is a perspective representation of my improved harvester; Fig. 2, a section of a part of the same, taken in line $x$ $x$, Fig. 1; Fig. 3, an elevation of the opposite side of the rake from that shown at Fig. 1. Figs. 4 and 5 are detached parts of the raking devices. Fig. 6 is an elevation showing the rake guide-cams with the switch of the upper cam.

The present invention relates to an improvement for raking grain as it falls upon the platform preparatory to binding it in bundles; and its nature, in part, consists in the novel manner in which the arm of the rake is held in place and guided in its work of gathering grain, in combination with a binder's platform and other mechanical appliances, as the whole is hereinafter fully shown.

A Z' represent the ordinary frame-work of a grain-harvester, and E the drive-wheel, having a wheel, F, attached to its shaft for operating the belt $m$ $m$, which drives the raking devices. An ordinary platform, B, is attached to that part of the frame shown at Z', and it is provided with a gavel-bed G, which reaches over the frame part Z' and terminates in a trough, H, in which the bundles are bound. A platform, G', being attached to the outside of the frame-work Z', is used for the operator to stand upon when binding bundles as the harvester moves along in the direction indicated by the dart $f'$, Fig. 1. A raking-arm, I, is pivoted to a slotted standard, V, attached to the rear part of the platform B, and to its opposite end is pivoted a short depending standard, N, which supports a jointed rake-head, M P. This arm I is made to carry the rake-head back and forth over the gavel-bed G by means of a connecting-rod, O, which is attached to a crank, W, on vertical shaft X, which has a pulley, $f$, fixed to its lower end and driven by the aforesaid belt $m$ $m$; and, in order to stop the rake when going to or from a field, a collar, $e$, is fixed to the shaft X, and so arranged that a clutch, $g$, pivoted to the frame Z', when operated upon by pulling forward on a connecting-rod, $h$, will raise it up and throw the pulley $f$, around which band $m$ $m$ passes, out of gear with a clutch-pin, $h'$, put through the standard X below said pulley.

A coil-spring, Y, placed above the collar $e$, and between it and the upper bearing of the shaft X, forces the pulley $f$ into gear with said clutch-pin, when the rod $h$ is loosened by the operator.

The elevation at Fig. 5 shows the clutch-pin $h'$, and the inverted view of pulley $f$, Fig. 4, shows the notch $c$ in which the pin locks.

The devices for guiding the rake in its forward movement consist in an elevated cam, U, which is attached to the platform B, and which is provided with a flange, S, under the lower side of which a hook, R, attached to the arm I, slides, and holds the rake M down to its work.

A rod, $t$, Fig. 3, fastening to the depending standard N, and having a guide-spur, $l'$, running into a groove, T, brings the rake around on the proper curve.

The device for guiding the rake in its backward movement and above the falling grain consists of a cam, K L, with switch $l$, which is supported by a standard, J, attached to the platform B, and over which a hook or lug, Q, Fig. 1, attached to the raking-arm I, passes and holds the rake up.

The devices, as described, work automatically, and at the same time in a very efficient manner, requiring only that the binder should keep the trough H free to receive the incoming gavel.

The reaping devices are not shown in the drawing; but, as their application is well understood, the adaptation of my invention to them cannot be misunderstood.

Having thus described my invention, what I claim, and desire to secure by Letters Patent of the United States, is—

1. The arm I, provided with hooks Q R and rake-head M P, in combination with standards V N, cam U, provided with a flange, S, and cam-groove T, connecting-rod O, crank and shaft W X, and cam K L, as and for the purpose set forth.

2. The combination of the arm I, rake M P, cams U KL, pulley $f$, collar $e$, clutch $g$, rod $h$, spring Y, trough H, and clutch-pin $h'$, as set forth and shown.

JEROME FRENCH.

Witnesses:
T. MANING,
J. LITTS,
S. S. ALLEN.